United States Patent
Lee et al.

(10) Patent No.: US 9,565,301 B2
(45) Date of Patent: Feb. 7, 2017

(54) APPARATUS AND METHOD FOR PROVIDING CALL LOG

(71) Applicant: Samsung Electronics Co., Ltd., Suwon-si (KR)

(72) Inventors: Ji Hyun Lee, Hwaseong-si (KR); Seok Jin Hong, Hwaseong-si (KR); Yo Han Roh, Hwaseong-si (KR); Sang Hyun Yoo, Seoul (KR); Ho Dong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 14/535,848

(22) Filed: Nov. 7, 2014

(65) Prior Publication Data
US 2015/0229761 A1 Aug. 13, 2015

(30) Foreign Application Priority Data
Feb. 11, 2014 (KR) .................. 10-2014-0015673

(51) Int. Cl.
| | | |
|---|---|---|
| H04M 3/42 | (2006.01) | |
| G06F 17/30 | (2006.01) | |
| G10L 25/48 | (2013.01) | |
| G10L 15/26 | (2006.01) | |

(52) U.S. Cl.
CPC .... *H04M 3/42221* (2013.01); *G06F 17/30746* (2013.01); *G10L 25/48* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 6,895,257 B2 | 5/2005 | Boman et al. | |
| 2006/0233325 A1* | 10/2006 | Wu | G06F 17/2735 379/88.13 |
| 2007/0041522 A1* | 2/2007 | Abella | H04M 3/5307 379/88.14 |
| 2007/0153989 A1* | 7/2007 | Howell | H04M 3/5307 379/88.14 |

(Continued)

FOREIGN PATENT DOCUMENTS

| | | |
|---|---|---|
| JP | 2008-252742 A | 10/2008 |
| JP | 2010-78979 A | 4/2010 |

(Continued)

OTHER PUBLICATIONS

A System and Method of Subject-based Communication History Management disclosed Anonymously and archived by IP.com, dated Apr. 2, 2011.*

*Primary Examiner* — Daniel Lai
(74) *Attorney, Agent, or Firm* — NSIP Law

(57) ABSTRACT

An apparatus for providing a call log includes a call detail information generator configured to generate call detail information of a call; a call recorder configured to record a call content of the call; a call content summarizer configured to convert the recorded call content into a transcribed text, and generate call content summary information based on the transcribed text; a call log generator configured to generate a call log including the call detail information and the call content summary information; and a call log provider configured to output the call log.

23 Claims, 13 Drawing Sheets

(56) References Cited

U.S. PATENT DOCUMENTS

2009/0275365 A1* 11/2009 Lee .................. H04M 1/271
                                                    455/563
2009/0290689 A1* 11/2009 Watanabe .......... H04M 3/5175
                                                    379/88.01

FOREIGN PATENT DOCUMENTS

| JP | 2012-222798 A | 11/2012 |
|----|---------------|---------|
| KR | 10-2012-0007081 A | 1/2012 |
| WO | WO 2004/095821 A2 | 11/2004 |

* cited by examiner

FIG. 3A

A: This is S Hotel
B: S Hotel?
A: Yes. Did you make a reservation for a room during two nights, 6<sup>th</sup> and 7<sup>th</sup> June?
B: Yes.
A: Please, pay for the room in advance.
   Please, transfer 300,000 won into K bank. The account number is 46110859201303.
B: Say the bank once again, please.
A: K bank 46110859201303.
B: 300,000 won, right?
A: Yes, Please, make the deposit within the week.
B: Ok.

FIG. 3B

A: Are you Mr. B? This is K Service.
B: Pardon?
A: This is K Service.
B: Ah~ Yes.
A: You had a fender-bender in the morning, didn't you? We've got the request for repair of the vehicle XX-1234.
B: Ah~.
A: Which part was damaged in the vehicle?
B: The front bumper was dented in the accident.
A: We will explain how to repair and how much pay for it after we check your vehicle. When and where am I going to take your vehicle?
B: Please, come to Y parking lot around 12 pm and call me.
A: Yes, I will visit Y parking lot and call you again around 12 pm.

APPARATUS AND METHOD FOR PROVIDING CALL LOG

CROSS-REFERENCE TO RELATED APPLICATIONS

This application claims the benefit under 35 USC 119(a) of Korean Patent Application No. 10-2014-0015673 filed on Feb. 11, 2014, in the Korean Intellectual Property Office, the entire disclosure of which is incorporated herein by references for all purposes.

BACKGROUND

1. Field

The following description relates to an apparatus and a method for providing a call log.

2. Description of Related Art

In general, a call log to be stored in a wired/wireless phone and a mobile phone merely includes incoming or outgoing call numbers, time information, and a counterpart's name, but does not include information on a call content.

Accordingly, a user has to infer a call content based on a counterpart's name and call duration included in a call log. Thus, it is difficult to remember the call content over time, and even more difficult to remember it when a counterpart name is not clearly identified in the call log.

In addition, when a user is unable to note down a call content during a call due to circumstances, the user must often rely on his/her own memory to recall the call content. Even if the user writes down the call content on paper or other things, since it is not managed together with a call log, the user needs to search for the call log to check the counterpart's name and call duration.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for providing a call log includes a call detail information generator configured to generate call detail information of a call; a call recorder configured to record a call content of the call; a call content summarizer configured to convert the recorded call content into a transcribed text, and generate call content summary information based on the transcribed text; a call log generator configured to generate a call log including the call detail information and the call content summary information; and a call log provider configured to output the call log.

The call content summarizer may be further configured to determine a meaningful sentence by analyzing a conversation pattern based on the transcribed test; extract at least one keyword from the meaningful sentence by taking into account a frequency or location of a word or phrase in the meaningful sentence; and generate call content summary information including the extracted at least one keyword.

The call content summarizer may be further configured to determine the meaningful sentence to be a part of the transcribed text in which a word or phrase is repeated at least a predetermined number of times.

The call content summarizer may be further configured to determine the meaningful sentence to be a sentence in the transcribed text that comes before or after a sentence including a specific word or phrase designated by a user.

The call content summarizer may be further configured to generate the call content summary information using a text mining technique.

The call log provider may include a call log storage configured to store the call log; and a call log outputter configured to output the stored call log.

The apparatus may further include an ontology generator configured to generate an ontology associated with the call log.

The call log outputter may be further configured to search for the stored call log using the ontology in response to a call log search request received from a user; and output a call log found in the search.

The call log outputter may be further configured to output a call log list including the stored call log in response to a call log provision request received from a user; and output a call log selected by the user from call logs in the output call log list.

The call detail information may include any one or any combination of a counterpart name, a call duration, a call date, a location where the call is received, and a counterpart call number.

In another general aspect, a method of providing a call log includes recording a call content of a call; storing the recorded call content; generating call detail information of the call; converting the recorded call content into a transcribed text; generating call content summary information based on the transcribed text; and generating a call log including the call detail information and the call content summary information.

The generating of the call content summary information may include determining a meaningful sentence by analyzing a conversation pattern based on the transcribed text; extracting at least one keyword by taking into account a frequency or location of a word or phrase in the meaningful sentence; and generating call content summary information including the extracted at least one keyword.

The generating of the call content summary information may include determining the meaningful sentence to be a part of the transcribed text in which a word or phrase is repeated at least a predetermined number of times.

The generating of the call content summary information may include determining the meaningful sentence to be a sentence in the transcribed text that comes before or after a sentence including a specific word or phrase designated by a user.

The generating of the call content summary information may include generating the call content summary information using a text mining technique.

The method may further include storing the call log; and outputting the stored call log.

The method may further include generating an ontology associated with the call log.

The outputting of the stored call log may include searching for the stored call log using the ontology in response to a call log search request received from a user; and outputting a call log found in the search.

The outputting of the stored call log may include outputting a call log list including the stored call log in response to a call log provision request received from a user; and outputting a call log selected by the user from call logs in the output call log.

The call detail information may include any one or any combination of a counterpart name, a call duration, a call date, a location where the call is received, and a counterpart call number.

In another general aspect, a method of providing a call log includes converting a call content of a call into a transcribed text; generating call content summary information based on the transcribed text; and outputting a call log including the call content summary information and call detail information of the call.

The generating of the call content summary information may include extracting a keyword from the transcribed text based on a conversation pattern in the transcribed text; and generating call content summary information including the extracted keyword.

The method may further include storing the call log; generating an ontology associated with the call log; searching for the stored call log using the ontology in response to a call log search request received from a user; and outputting a call log found in the search.

Other features and aspects may be apparent from the following detailed description, the drawings, and the claims.

BRIEF DESCRIPTION OF THE DRAWINGS

FIGS. 3A and 3B illustrate examples of a transcribed text converted from a recorded call content.

FIGS. 4A and 4B illustrate an example of a call log list.

DETAILED DESCRIPTION

Figure 1:
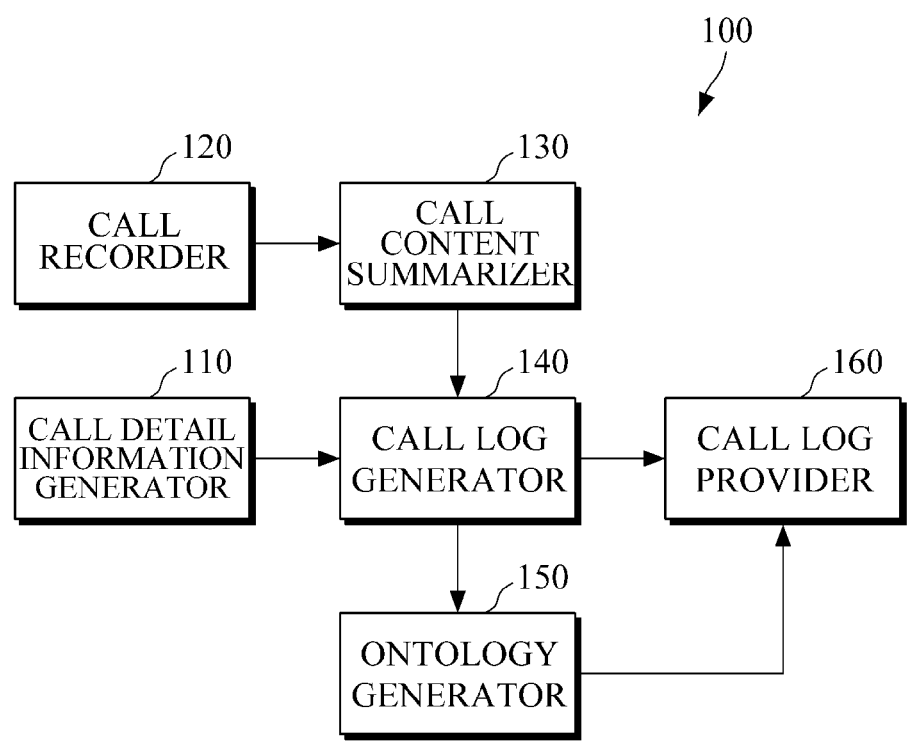
FIG. 1 illustrates an example of a configuration of an apparatus for providing a call log.

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 illustrates an example of a configuration of an apparatus of providing a call log.

Referring to FIG. 1, an apparatus 100 for recording a call log includes a call detail information generator 110, a call recorder 120, a call content summarizer 130, a call log generator 140, an ontology generator 150, and a call log provider 160.

The apparatus 100 may be a terminal that provides a call function over either a mobile communication network or a public switched telephone network, or over a wired/wireless Internet communication network.

The terminal may be, for example, a mobile phone, a Personal Digital Assistant (PDA), a wired/wireless telephone, a smart phone, a desk top, a laptop, or a tablet PC. In addition, a call may be a voice call or a video call.

If a user makes a call using a terminal, the call detail information generator 110 generates call detail information of the call. The call detail information contains any one or any combination of a call number of a counterpart, call date, a call time, and a location where the user receives the call.

The call detail information generator 110 generates call detail information based on information collected by or stored in a terminal.

For example, a counterpart's call number (hereinafter referred to as a counterpart call number) may be collected from incoming call information included in a call connection request signal that has been transmitted to a terminal. Alternatively, if a user makes a call to a different person using a terminal, a call number input by the user or a call number selected from a contact list stored in the terminal may be determined as a counterpart call number.

A counterpart's name may be collected from a contact list stored in a terminal. For example, if an incoming call number included in a call connection request signal has been registered in a pre-stored contact list, the call detail information generator 110 may determine a name registered in the contact list as a counterpart's name. Alternatively, if a user makes a call to a different person using a terminal, and the different person's call number input by the user has been registered in a pre-stored contact list, the call detail information generator 110 may determine a name registered in the contact list corresponding to the call number as a counterpart's name.

In another example, if a user makes a voice call using a terminal, the call detail information generator 110 may collect information on a call time, a call date, and a call duration based on time information provided by the terminal.

In another example, if a terminal provides location information using a global positioning system (GPS) or on the Internet, the call detail information generator 110 may collect information on a location where a voice call is received at a time when the voice call is made.

In another example, if a terminal provides weather information over the Internet, the call detail information generator 110 may collect weather information regarding a point in time when a call is made.

The call recorder 120 records a call content of a call made by a user, and stores the recorded call content.

In one example, the call recorder 120 records a call content according to a selection by a user. For example, in response to a call request, the call recorder 120 asks a user whether to record a call, and then, at the user's request, the call recorder 120 records a call content of the call.

In another example, if a user on the phone requests recording a call content of a call, the call recorder 120 records the call content of the call from a point in time when the request is received.

In another example, if an incoming call from a call number predetermined by a user is received, the call recorder 120 records a call content of the call from a point in time the call is initiated.

In another example, the call recorder 120 records a call content of every call carried out in a terminal.

The call content summarizer 130 converts the recorded call content into a transcribed text, and generates call content summary information based on the transcribed text.

For example, the call content summarizer 130 performs Natural Language Processing (NLP) on the transcribed text, and generates the call content summary information using a call pattern analyzing technique or a text mining technique.

The call content summarizer 130 generates the call content summary information by identifying a meaningful sentence from the transcribed text, and then extracting at least one keyword from the identified meaningful sentence.

For example, the call content summarizer 130 may determine a meaningful sentence to be a sentence that contains a word or phrase repeated in the transcribed text.

In another example, the call content summarizer 130 may determine a meaningful sentence to be a part of the transcribed text in which a specific identical or similar word or phrase is repeatedly said between speakers at least a predetermined number of times.

In another example, if the transcribed text includes a specific word or phrase previously designated by a user, the call content summarizer 130 may determine a meaningful sentence to be a sentence that comes before or after a sentence containing the specific word or phrase.

Meanwhile, after extracting at least one keyword from the meaningful sentence by taking account of a frequency or location of the word or phrase in the meaningful sentence, the call content summarizer 130 generates call content summary information containing the extracted keyword.

The call content summarizer 130 may generate the call content summary information using a document summarization technique or a text mining technique, such as topic modeling.

For example, the call content summarizer 130 may generate call content summary information using an extractive summarization technique or an abstract summarization technique. In the extractive summarization technique, sentences representing a transcribed text are identified, and then the extracted representative sentences are summarized into a new sentence. In the abstractive summarization technique, the main concept or idea of a transcribed text is identified, and the identified main concept or idea is abstracted to a new sentence.

In another example, the call content summarizer 130 generates call content summary information using topic modeling, such as Latent Dirichlet Allocation (LDA).

The call log generator 140 generates a call log that includes call detail information and call content information. Specifically, the call log generator 140 generates a call log by adding call content summary information to call detail information.

The ontology generator 150 generates an ontology associated with the generated call log. An ontology refers to a knowledge base that includes object types and a relation between objects.

In one example, the ontology generator 150 generates an ontology associated with a call log using named entity recognition, relation extraction, and semantic annotation techniques.

For example, using the Name Entity Recognition technique, the ontology generator 150 extracts objects including a person, a place, an organization, and a time from a text, and may extracts a relation between extracted objects using the Relation Extraction technique. Then, the ontology generator 150 generates an ontology associated with a call log so that the ontology generator 150 extracts information on the extracted relation between objects from a pre-established global ontology or a domain specific ontology, and then reflects the extracted information on an ontology.

The call log provider 160 stores a call log generated in the call log generator 140, and outputs the stored call log in response to a call log provision request from a user.

In one example, the call log provider 160 performs semantic searching using an ontology in response to a request for searching for a stored call log, and outputs the found call log.

Figure 2:
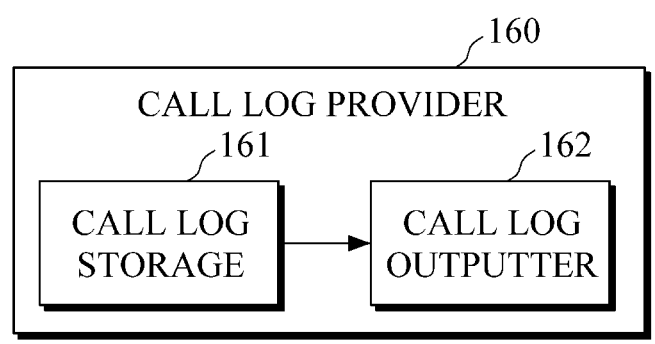
FIG. 2 illustrates an example of a configuration of a call log provider shown in FIG. 1.

FIG. 2 illustrates an example of a configuration of a call log provider shown in FIG. 1. Hereinafter, FIG. 2 is described with reference to FIG. 1.

Referring to FIG. 2, the call log provider 160 includes a call log storage 161 and a call log outputter 162.

The call log storage 161 stores a call log generated by the call log generator 140.

In response to a call log provision request received from a user, the call log outputter 162 outputs a call log stored in the call log storage 161.

In one example, in response to a call log provision request received from a user, the call log outputter 162 outputs a call log stored in the call log storage 161 in the form of a call log list. At this point, if a user selects a call log from the output call log list, the call log outputter 162 outputs the selected call log.

In one example, in response to a call log search request received from a user, the call log outputter 162 performs a semantic search for a stored call log using an ontology generated in the ontology generator 150.

At this point, the call log outputter 162 outputs the found call log in the form of a call log list. If a user selects a specific call log from the output call log list, the call log outputter 162 outputs the selected call log.

A call log output by the call log outputter 162 may be displayed on a display device embedded in a terminal or connected to an external device. The display device may be, for example, an Organic Light Emitting Diode (OLED) display, a Liquid Crystal Display (LCD) display, or a Plasma Display Panel (PDP).

FIGS. 3A and 3B illustrate examples of a transcribed text converted from a recorded call content. FIGS. 3A and 3B are described hereinafter with reference to FIG. 1.

In FIGS. 3A and 3B, it is presumed that person A is a user of a terminal, and person B is whom the user is talking with on the phone.

Referring to FIG. 3A, an example of how the call content summarizer 130 extracts a keyword is described below.

In the example illustrated in FIG. 3A, "S Hotel" and "300,000 won" are repeatedly said between two people. Accordingly, the call content summarizer 130 extracts "S Hotel" and "300,000 won" as keywords from the transcribed text.

In addition, "K bank" and "46110859201303" are repeatedly said twice by the person A. Accordingly, the call content summarizer 130 extracts "K bank" and "46110859201303" as keywords.

In addition, if "again" is a word that has been previously registered by a user, the call content summarizer 130 extracts "K bank" and "46110859201303", which are repeated in sentences before and after a sentence including "again", as keywords.

Referring to FIG. 3B, "K Service", "vehicle," and "repair" are repeatedly said by person A. Accordingly, the call content summarizer 130 extracts "K Service", "vehicle," and "repair" as keywords.

In addition, "12 pm" and "Y parking lot" are repeatedly said between the two people. Accordingly, the call content summarizer 140 extracts "12 pm" and "Y parking lot" as keywords.

Moreover, if "pardon" is a word that has been previously registered by a user among all the words included in the transcribed text, the call content summarizer 130 extracts "K Service", which is repeated in sentences before and after a sentence including "pardon", as a keyword.

Figure 4A:
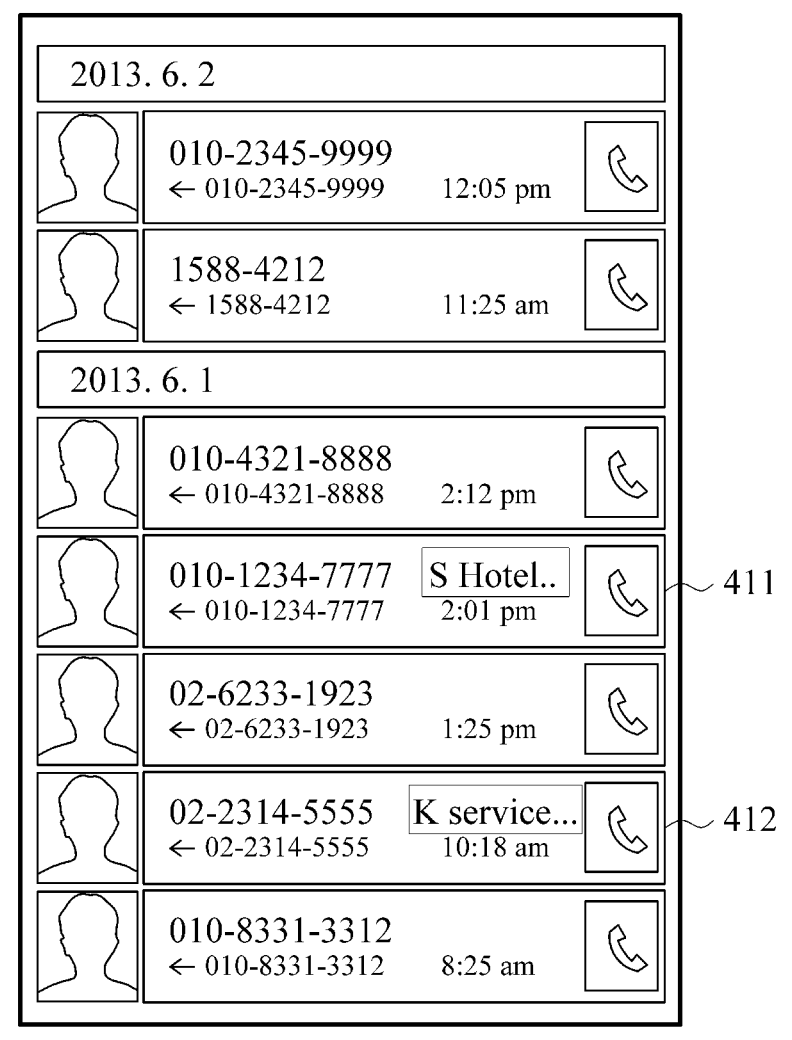
Figure 4B:
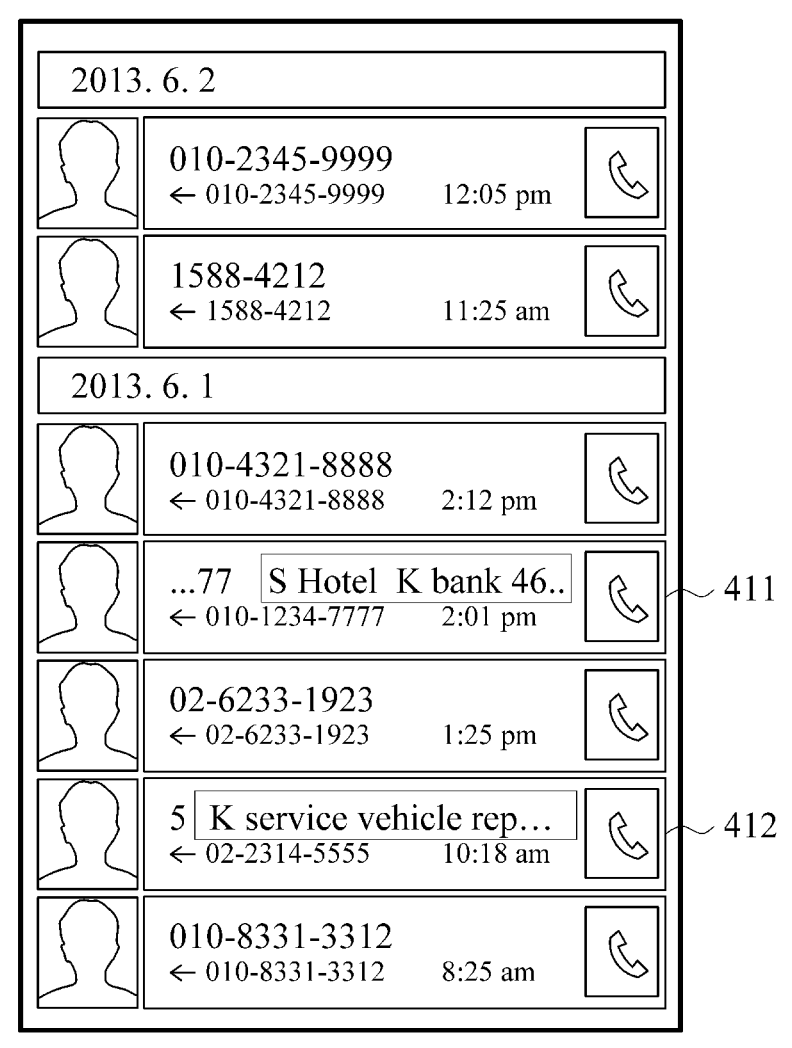
Figure 4C:
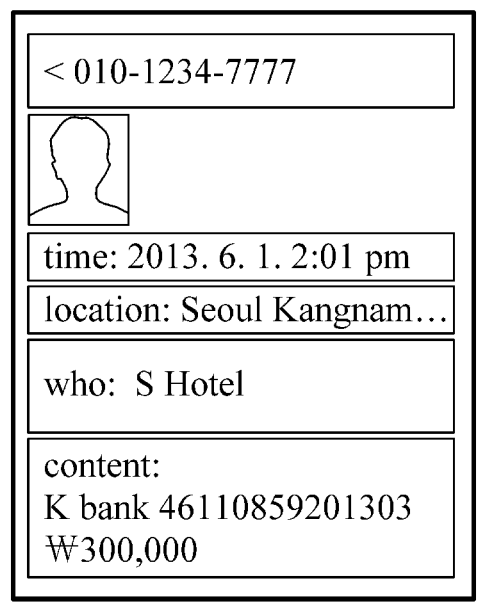
FIGS. 4C and 4D illustrate examples of call logs in the call log list.
Figure 4D:
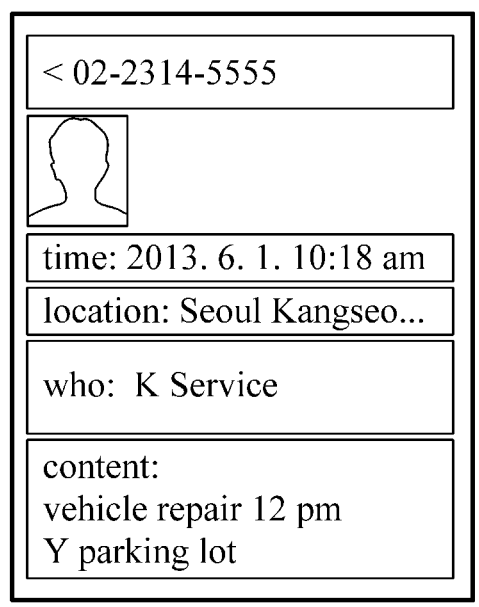

FIGS. 4A and 4B illustrate an example of a call log list, and FIGS. 4C and 4D illustrate examples of call logs in the call log list.

FIGS. 4A and 4B illustrate an example of a call log list in which call logs are arranged chronologically. The call log list includes call detail information and call content summary information for each call. The call content summary information may be displayed in a crawl as illustrated in the example of FIGS. 4A and 4B. Specifically, reference numbers 411 and 412 in the call log list shown in FIGS. 4A and 4B include call content summary information, and call content summary information of each call may be displayed in a crawl in a left-to-right direction.

FIGS. 4A and 4B illustrate an example of a call log list, but a call log list is not limited to this example. For example, a call log list may be output in an order according to a counterpart's name or a location where the counterpart received the call, and the ordering standard may be set or changed by a user.

Referring to FIGS. 4C and 4D, if a user selects a call log from a call log list, the call log outputter 162 outputs the selected call log.

Each call log includes call detail information and call content summary information. Specifically, with reference to the examples shown in FIGS. 4C and 4D, a call number of a counterpart, a location where the counterpart received the call, and a name of the counterpart may be provided based on information included in the call detail information. In addition, the call content summary information may be provided as call content.

In one example, when a call number of a counterpart is registered in a contact list stored in a terminal, a name registered in the contact list is output as the name of a counterpart.

In one example, when a call number of a counterpart is not registered in a contact list, the counterpart's name is extracted from call content.

For example, in the case of a voice call, a caller typically reveals his identity at the beginning of a conversation in most cases. Thus, a word following "This is" is extracted from the first sentence said by the caller in a transcribed text, and the extracted word is displayed as the name of a caller.

Figure 5A:
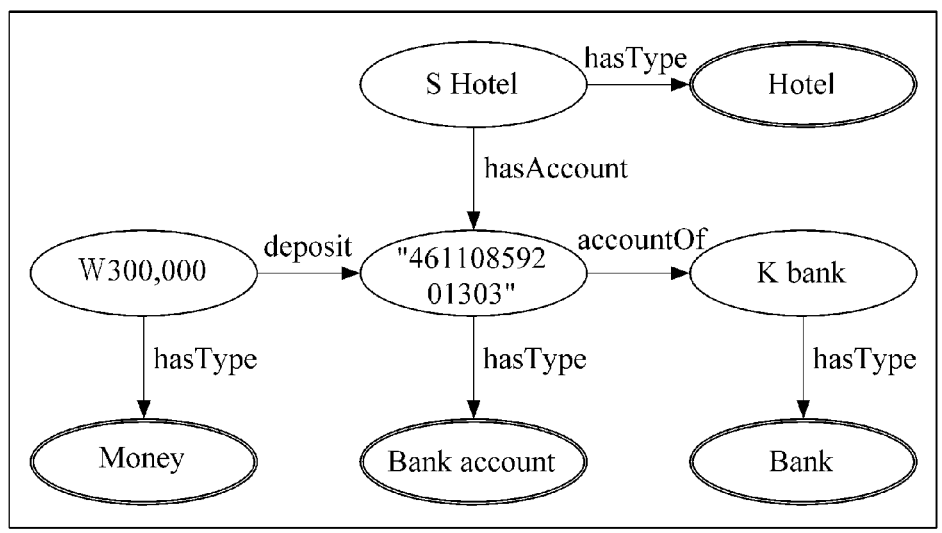
FIGS. 5A and 5B illustrate examples of an ontology used in searching for a call log.
Figure 5B:
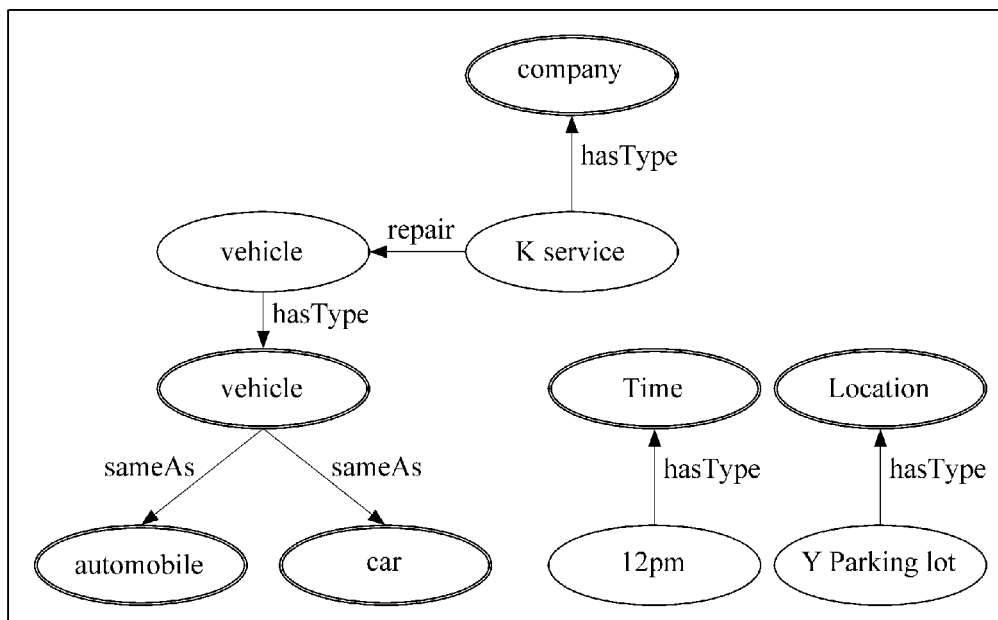

FIGS. 5A and 5B illustrate examples of an ontology used in searching for a call log.

In the examples illustrated in FIGS. 5A and 5B, a thin-line circle indicates an object extracted from a call log, and a thick-line circle indicates a type of an object connected thereto.

FIG. 5A illustrates an example of an ontology that is generated regarding the call log shown in FIG. 4C.

In the example shown in FIG. 5A, each of "deposit", "hasAccount," and "accountOf" indicates a relation between objects. The relation between objects may be obtained using a Relation Extraction technique and a Semantic Annotation technique.

If a user requests a search for a call log with the keyword "hotel account", the call log shown in FIG. 4C is not found since the call log shown in FIG. 4C includes "hotel" but does not include "account."

However, the ontology illustrated in FIG. 5A implies that "46110859201303" is an account. Thus, the call log outputter 162 outputs a call log including "hotel" and "46110859201303" as a search result.

FIG. 5B illustrates an example of an ontology that is generated regarding the call log illustrated in FIG. 4D.

In the example illustrated in FIG. 5B, "repair" above an arrow between the objects of "vehicle" and "K service" indicates a relation between the objects. In addition, "sameAs" placed between "vehicle" and "car" indicates that the two words "vehicle" and "car" have a synonymous relation, and the synonymous relation may be extracted using an ontology dictionary, such as WordNet.

In addition, "12 pm" and "Y Parking lot" may be recognized based on time information provided by a terminal or using a Global Positioning System (GPS), designated as types "Time and "Location", respectively, and then reflected in an ontology.

Meanwhile, if a user requests a search for a call log with a keyword "car repair", the call log outputter 162 outputs a call log including "vehicle" and "repair" since the ontology shown in FIG. 5B suggests that "vehicle" carries the same meaning as "car" even though the call log shown in FIG. 4D does not include "car."

The call log outputter 162 outputs the found call log in the form of a call log list. In addition, if a user selects a call log from a call log list, the call log outputter 162 outputs the selected call log.

Figure 6:
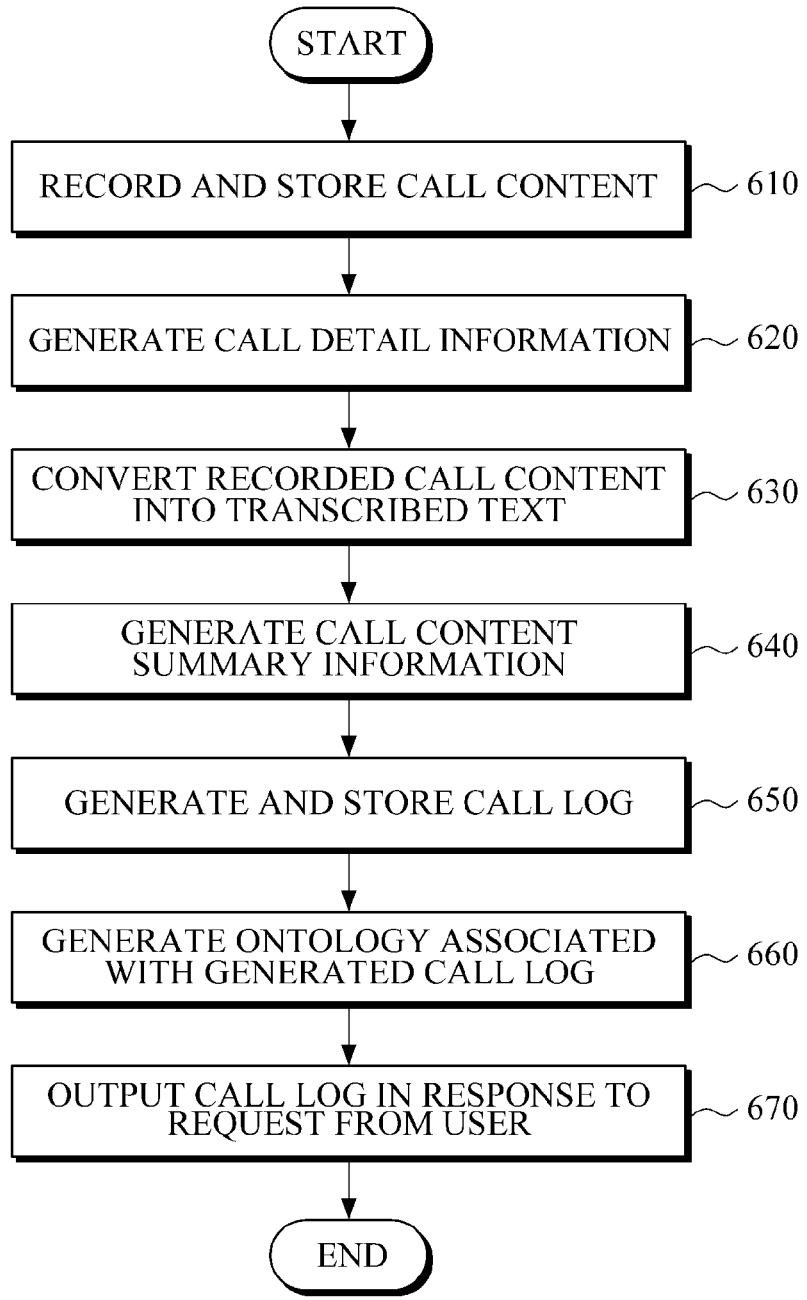
FIG. 6 illustrates an example of a method of providing a call log.

FIG. 6 illustrates an example of a method of providing a call log. Hereinafter, FIG. 6 is described in detail with reference to FIG. 1.

Referring to FIG. 6, if a user makes a call using a terminal, the apparatus 100 records a call content of the call and stores the recorded call content in operation 610.

The apparatus 100 generates call detail information for the call in operation 620. The call detail information contains one or any combination of a call number of a counterpart, a name of the counterpart, a location where the counterpart received a corresponding call, and a call duration time.

The apparatus 100 converts the recorded call content into a transcribed text in operation 630, and then generates call content summary information in operation 640.

In one example, the apparatus 100 determines a meaningful sentence by analyzing a conversation pattern of the transcribed text, and generates call content summary information including a keyword extracted from the meaningful sentence.

In one example, the apparatus 100 generates the call content summary information by applying a text mining technique to the transcribed text.

In operation 650, the apparatus 100 generates a call log including the call detail information and the call content summary information, and stores the generated call log.

In operation 660, the apparatus 100 generates an ontology associated with the generated call log.

In operation 670, the apparatus 100 outputs the stored call log in response to a request from a user.

Figure 7:
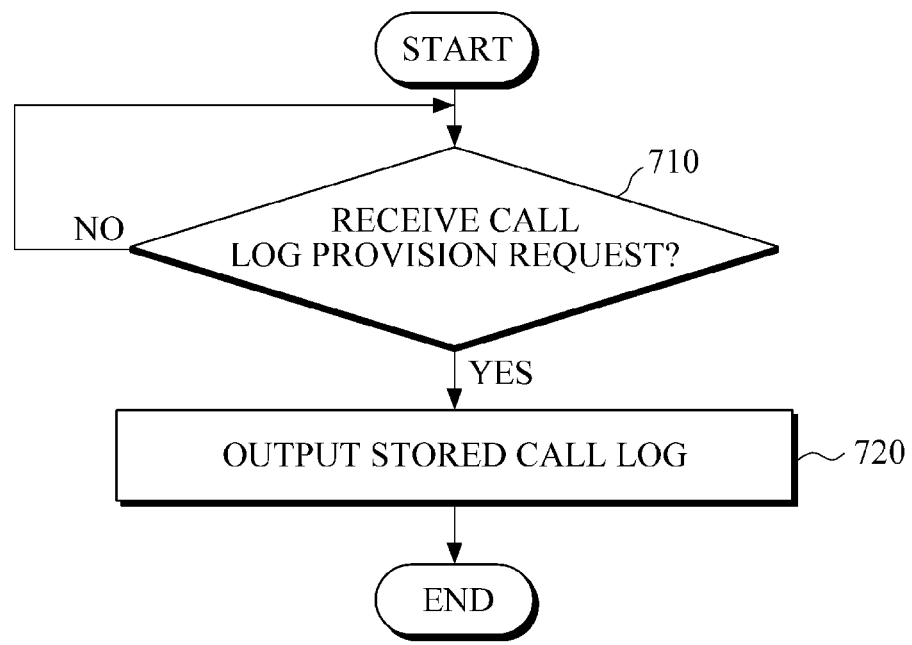
FIG. 7 illustrates an example of a method of providing a call log in response to a call log provision request.

FIG. 7 illustrates an example of a method of providing a call log in response to a call log provision request. Hereinafter, FIG. 7 is described in detail with reference to FIG. 1.

Referring to FIG. 7, if a call log provision request is received from a user in operation 710, the apparatus 100 outputs a stored call log in operation 720.

In one example, the apparatus 100 outputs a stored call log in the form of a call log list. For example, the apparatus 100 may output a stored call log in the form of a call log list that is sorted in order according to call date or call time.

In another example, the apparatus 100 may output stored call logs as a call log list that is sorted in order according to a counterpart's name or a call received location.

However, the ordering of the call log list is not limited to these examples. That is, a call log list that is sorted in order according to various types of information included in the call logs may be output. In addition, a user may set or change the ordering standard, and the apparatus 100 may output a call log list that is ordered by the ordering standard set by the user.

Meanwhile, if a user selects a call log from a call log list, the apparatus 100 outputs the selected call log.

Figure 8:
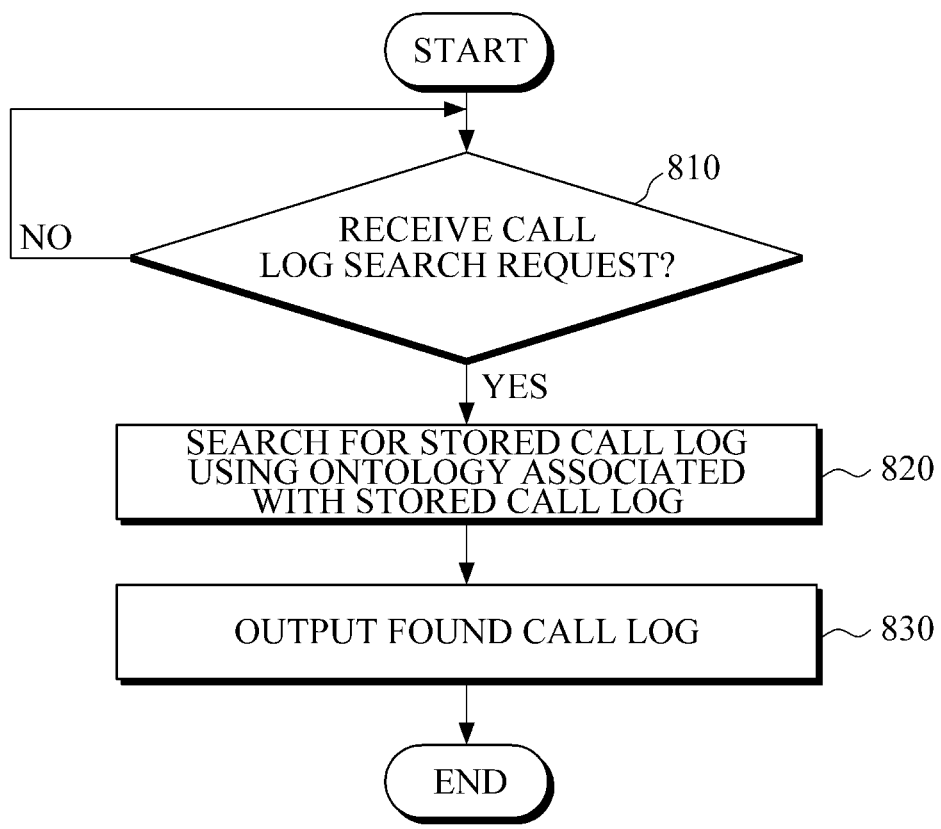
FIG. 8 illustrates an example of a method of providing a call log in response to a call log search request.

FIG. 8 illustrates an example of a method of providing a call log in response to a call log search request. Hereinafter, FIG. 8 is described in detail with reference to FIG. 1.

Referring to FIG. 8, if a call log search request is received from a user in operation 810, the apparatus 100 performs a semantic search for a stored call log using an ontology associated with the stored call log in operation 820.

In operation 830, the apparatus 100 outputs the found call log. For example, the apparatus 100 outputs the found call log in the form of a call log list. At this point, when a user selects a call log from the output call log list, the apparatus 100 outputs the selected call log.

The call detail information generator 110, the call recorder 120, the call content summarizer 130, the call log generator 140, the ontology generator 150, and the call log provider 160 in FIG. 1, and the call log storage 161 and the call log outputter 162 in FIG. 2 that perform the various operations described with respect to FIGS. 1, 2, 3A, 3B, 4A-4D, 5A, 5B, and 6-8 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for providing a call log, the apparatus comprising:
    a call detail information generator configured to generate call detail information of a call;
    a call recorder configured to record a call content of the call;
    a call content summarizer configured to
        convert the recorded call content into a transcribed text,
        extract a keyword from the transcribed text, and
        generate call content summary information comprising the extracted keyword;
    a call log generator configured to generate a call log comprising the call detail information and the call content summary information;
    an ontology generator configured to generate an ontology associated with the call log, wherein the ontology comprises objects extracted from the call content summary information, types of the extracted objects, and relationships between the extracted objects; and
    a call log provider configured to output the call log.

2. The apparatus of claim 1, wherein the call content summarizer is further configured to:
    determine a meaningful sentence by analyzing a conversation pattern based on the transcribed text;
    extract the keyword from the meaningful sentence based on a frequency or location of a word or phrase in the meaningful sentence; and
    generate the call content summary information comprising the extracted keyword.

3. The apparatus of claim 2, wherein the call content summarizer is further configured to determine the meaningful sentence to be a part of the transcribed text in which a word or phrase is repeated at least a predetermined number of times.

4. The apparatus of claim 2, wherein the call content summarizer is further configured to determine the meaningful sentence to be a sentence in the transcribed text that comes before or after a sentence comprising a specific word or phrase designated by a user.

5. The apparatus of claim 1, wherein the call content summarizer is further configured to generate the call content summary information using a text mining technique.

6. The apparatus of claim 1, wherein the call log provider comprises:
    a call log storage configured to store the call log; and
    a call log outputter configured to output the stored call log.

7. The apparatus of claim 6, wherein the call log outputter is further configured to:
    search the generated ontology to locate the stored call log in response to a call log search request received from a user; and
    output the located call log.

8. The apparatus of claim 6, wherein the call log outputter is further configured to:
    output a call log list comprising the stored call log in response to a call log provision request received from a user; and
    output a call log selected by the user from call logs in the output call log list.

9. The apparatus of claim 1, wherein the call detail information comprises any one or any combination of a counterpart name, a call duration, a call date, a location where the call is received, and a counterpart call number.

10. The method of claim 1, wherein the call content summary information comprises a summary sentence generated through an extractive summarization technique or an abstractive summarization technique,
    wherein the extractive summarization technique comprises extracting sentences from the transcribed text and summarizing the extracted sentences into the summary sentence, and
    wherein the abstractive summarization technique comprises identifying a main concept of the transcribed text and generating the summary sentence from the identified main concept.

11. A method of providing a call log, the method comprising:
    recording a call content of a call;
    storing the recorded call content;
    generating call detail information of the call;
    converting the recorded call content into a transcribed text;
    extracting a keyword from the transcribed text;
    generating call content summary information comprising the extracted keyword;
    generating a call log comprising the call detail information and the call content summary information; and
    generating an ontology associated with the call log, wherein the ontology comprises objects extracted from the call content summary information, types of the extracted objects, and relationships between the extracted objects.

12. The method of claim 11, wherein the generating of the call content summary information comprises:

determining a meaningful sentence by analyzing a conversation pattern based on the transcribed text;
extracting the keyword based on a frequency or location of a word or phrase in the meaningful sentence; and
generating the call content summary information comprising the extracted keyword.

13. The method of claim 12, wherein the generating of the call content summary information comprises determining the meaningful sentence to be a part of the transcribed text in which a word or phrase is repeated at least a predetermined number of times.

14. The method of claim 12, wherein the generating of the call content summary information comprises determining the meaningful sentence to be a sentence in the transcribed text that comes before or after a sentence comprising a specific word or phrase designated by a user.

15. The method of claim 11, wherein the generating of the call content summary information comprises generating the call content summary information using a text mining technique.

16. The method of claim 11, further comprising:
storing the call log; and
outputting the stored call log.

17. The method of claim 16, wherein the outputting of the stored call log comprises:
searching the generated ontology to locate the stored call log in response to a call log search request received from a user; and
outputting the located call log.

18. The method of claim 16, wherein the outputting of the stored call log comprises:
outputting a call log list comprising the stored call log in response to a call log provision request received from a user; and
outputting a call log selected by the user from call logs in the output call log.

19. The method of claim 11, wherein the call detail information comprises any one or any combination of a counterpart name, a call duration, a call date, a location where the call is received, and a counterpart call number.

20. A method of providing a call log, the method comprising:
converting a call content of a call into a transcribed text;
generating call content summary information based on the transcribed text;
outputting a call log comprising the call content summary information and call detail information of the call; and
generating an ontology associated with the call log, wherein the ontology comprises objects extracted from the call content summary information, types of the extracted objects, and relationships between the extracted objects.

21. The method of claim 20, wherein the generating of the call content summary information comprises:
extracting a keyword from the transcribed text based on a conversation pattern in the transcribed text; and
generating the call content summary information comprising the extracted keyword.

22. The method of claim 20, further comprising:
storing the call log;
searching for the stored call log using the ontology in response to a call log search request received from a user; and
outputting a call log found in the search.

23. The method of claim 20, wherein the call content summary information comprises a summary sentence generated through an extractive summarization technique or an abstractive summarization technique,
wherein the extractive summarization technique comprises extracting sentences from the transcribed text and summarizing the extracted sentences into the summary sentence, and
wherein the abstractive summarization technique comprises identifying a main concept of the transcribed text and generating the summary sentence from the identified main concept.

* * * * *